United States Patent
Yang et al.

(10) Patent No.: US 8,249,548 B2
(45) Date of Patent: Aug. 21, 2012

(54) METHOD AND DEVICE FOR GENERATING USER MOBILITY MODEL OF CELLULAR NETWORK

(75) Inventors: Xiaofan Yang, Beijing (CN); Hui Liu, Beijing (CN); Jiang Gao, Beijing (CN); Wei Sun, Beijing (CN); Lifen Zhou, Beijing (CN); Wentong Bi, Beijing (CN); Li Huang, Beijing (CN); Fangyuan Wang, Beijing (CN); Gang Wang, Beijing (CN); Miao Li, Beijing (CN)

(73) Assignee: China Mobile Group Beijing Co., Ltd., Beijing (CN)

( * ) Notice: Subject to any disclaimer, the term of this patent is extended or adjusted under 35 U.S.C. 154(b) by 108 days.

(21) Appl. No.: 12/747,600

(22) PCT Filed: Dec. 17, 2008

(86) PCT No.: PCT/CN2008/002022
§ 371 (c)(1),
(2), (4) Date: Jul. 20, 2010

(87) PCT Pub. No.: WO2009/092187
PCT Pub. Date: Jul. 30, 2009

(65) Prior Publication Data
US 2010/0298007 A1 Nov. 25, 2010

(30) Foreign Application Priority Data
Dec. 26, 2007 (CN) .......................... 2007 1 0304239

(51) Int. Cl.
*H04M 11/04* (2006.01)
(52) U.S. Cl. ............... 455/404.2; 455/456.1; 455/456.2; 455/456.3; 455/404.1

(58) Field of Classification Search ............... 455/404.1, 455/404.2, 414.1, 414.2, 422.1, 456.1, 456.2, 455/456.3, 456.4, 456.6, 432.3, 434, 435.1
See application file for complete search history.

(56) References Cited

U.S. PATENT DOCUMENTS

| | | | |
|---|---|---|---|
| 6,414,635 B1 * | 7/2002 | Stewart et al. | 342/457 |
| 7,644,167 B2 * | 1/2010 | Lee et al. | 709/229 |
| 7,925,272 B2 * | 4/2011 | Hjelm et al. | 455/456.2 |
| 2006/0182055 A1 * | 8/2006 | Coffee et al. | 370/328 |
| 2007/0008925 A1 * | 1/2007 | Dravida et al. | 370/331 |
| 2007/0066286 A1 | 3/2007 | Hurtta | |
| 2007/0252761 A1 * | 11/2007 | Koorapaty et al. | 342/464 |
| 2008/0004037 A1 * | 1/2008 | Achlioptas et al. | 455/456.1 |
| 2008/0248815 A1 * | 10/2008 | Busch | 455/456.5 |
| 2009/0005987 A1 * | 1/2009 | Vengroff et al. | 701/300 |
| 2010/0120422 A1 * | 5/2010 | Cheung et al. | 455/434 |

FOREIGN PATENT DOCUMENTS

| CN | 1794860 A | 6/2006 |
|---|---|---|
| CN | 10217758 A | 7/2008 |

\* cited by examiner

*Primary Examiner* — Jean Gelin
(74) *Attorney, Agent, or Firm* — Workman Nydegger

(57) ABSTRACT

A method for generating a user mobility model includes: firstly deriving user movement tracks of all the users in a cellular network and then generating from the user movement tracks a user mobility model involving a user traffic between home cells of any two of path points in the cellular network. Thus, a cell can be re-divided into respective location areas according to the generated user mobility model to thereby deploy reasonably various network resources in the GSM network according to the re-divided positional zones. The invention further discloses a method and device for generating a user movement track and a device for generating a user mobility model.

17 Claims, 5 Drawing Sheets

$$\begin{bmatrix} & A1 & B1 & B2 & B3 & B4 & A2 \\ A1 & 0 & 1 & 0 & 4 & 0 & 0 \\ B1 & 1 & 0 & 3 & 1 & 0 & 1 \\ B2 & 0 & 1 & 0 & 0 & 0 & 3 \\ B3 & 3 & 1 & 0 & 0 & 3 & 0 \\ B4 & 0 & 2 & 0 & 2 & 0 & 1 \\ A2 & 0 & 1 & 1 & 0 & 2 & 0 \end{bmatrix}$$

Fig. 6

$$\begin{bmatrix} & A1 & B1 & B2 & B3 & B4 & A2 & \cdots\cdots & N \\ A1 & 0 & & & & & & & \\ B1 & & 0 & & & & & & \\ B2 & & & 0 & & & & & \\ B3 & & & & 0 & & & \vdots & \\ B4 & \vdots & & & & 0 & & \vdots & \\ A2 & & & & & & 0 & & \\ \vdots & & & & & & & & \\ N & & & & \cdots\cdots & & & & 0 \end{bmatrix}$$

Fig. 7

METHOD AND DEVICE FOR GENERATING USER MOBILITY MODEL OF CELLULAR NETWORK

CROSS-REFERENCE TO RELATED APPLICATIONS

The present application claims the benefit of priority to International Patent Application No. PCT/CN2008/002022 filed on 17 Dec. 2008, which further claims the benefit of priority to Chinese patent Application No. 200710304239.8 filed on 26 Dec. 2007, the contents of which are incorporated herein by reference in their entirety.

FIELD OF THE INVENTION

The present invention relates to communications and computer fields, and particularly to a method and device for generating a user mobility model of a cellular network.

BACKGROUND OF THE INVENTION

A user mobility model corresponding to a huge number of users in a cellular network (for example, GSM network) is required to be created in order for better management on the GSM network, and the so-called user mobility model involves various behaviors of the users, e.g., behaviors of mobility, communication and short messages, and can reflect actually an influence of the huge number of users upon the GSM network. Operations of location and radio resource management, customer behavior analysis, network resource recombination, resource reservation, etc., can be performed on the GSM network according to the created user mobility model. Features of the GSM network can be learned ideally and the GSM network can be deployed reasonably to thereby improve the utilization ratio of various network resources to the maximum extent only if the user mobility mode is obtained.

Unfortunately, no appropriate method has been provided in the prior art to create a corresponding user mobility model for the huge number of users in the cellular network.

SUMMARY OF THE INVENTION

Embodiments of the invention provide a method and device for generating a user mobility model of a cellular network to deploy reasonably various network resources in the cellular network to thereby improve the utilization ratio of the various network resources.

Specific technical solutions according to the embodiments of the invention are as follows.

A method for generating a user movement track, including:

deriving all known path points that a user passes, with all the known path points being arranged in a temporal sequence in which user events occur with the user at the respective known path points;

deriving a known user movement track between adjacent two of the known path points based upon the temporal sequence;

generating an unknown user movement track containing at least one unknown path point between two adjacent known path points satisfying a preset condition; and connecting the known user movement tracks and the unknown user movement tracks in a temporal sequence to derive a user movement track of the user.

A device for generating a user movement track, including:

a derivation unit adapted to derive all known path points that a user passes, with all the known path points being arranged in a temporal sequence in which user events occur with the user at the respective known path points, and derive a known user movement track present between adjacent two of the known path points based upon the temporal sequence;

a storage unit adapted to store the information derived by the derivation unit and a preset condition for determining whether to generate an unknown user movement track between two adjacent known path points;

a processing unit adapted to generate an unknown user movement track containing at least one unknown path point between two adjacent known path points satisfying the preset condition; and a connection unit adapted to connect the known user movement tracks and the unknown user movement tracks in a temporal sequence to derive a user movement track of the user.

In the embodiments of the invention, firstly the user movement tracks of all the users in the cellular network, include known user movement tracks and unknown user movement tracks, are derived; and then the user mobility model involving a user traffic between home cells of any two of path points including known and unknown path points in the cellular network is generated from the user movement tracks of all the users. Thus, a cell can be re-divided into location areas according to the generated user mobility model so that the differences between total network loads of all the location areas are less than a preset threshold, and a user traffic at a boundary between any two of all the location areas that are physically adjacent is less than a preset threshold to thereby deploy reasonably various network resources in the GSM network according to the location areas for load balancing thereof and hence improve the utilization ratio of the various network resources; and also the reduced user traffic between the respective location areas can considerably decrease location update flows to be triggered because a user moves across the location areas, to thereby save the network resources to some extent.

BRIEF DESCRIPTION OF THE DRAWINGS

FIG. 6 is a schematic diagram of a first Markov matrix according to an embodiment of the invention;

FIG. 7 is a schematic diagram of a second Markov matrix according to an embodiment of the invention;

DETAILED DESCRIPTION OF THE EMBODIMENTS

In order to create a corresponding user mobility model for a huge number of users in a cellular network (for example, GSM network) to thereby deploy reasonably the GSM network, firstly user movement tracks of the respective users in the GSM network are generated and then the user mobility model for all the users in the GSM network is generated from the derived respective user movement tracks in an embodiment of the invention.

During generation of the user movement track, firstly all known path points that the user passes are derived, with the path points being arranged in a temporal sequence in which user events occur with the user at the respective known path points, then a known user movement track present between adjacent two of the known path points is derived based upon the temporal sequence, an unknown user movement track containing at least one unknown path point is generated between two adjacent known path points satisfying a preset condition, and the known user movement tracks and the unknown user movement tracks are connected in a temporal sequence to derive the user movement track of the user.

During generation of the user mobility model, the user movement tracks of all the users in the GSM network are derived in the foregoing method for generating a user movement track, and then the user mobility model is generated from the user movement tracks of the respective users, and the user mobility model involves user traffic between any two of the path points in the cellular network, which include known and unknown path points.

In a practical application, when a user event occurs with a user, e.g., powering on/off, reception/transmission of a short message, dialing a call, answering a call, hanging up, a location update for crossing location areas, physical location information of a home base station of the site where the user event occurs can be derived in numerous methods, for example, from a signaling and an event collecting platform in the GSM network. Therefore, such a base station is referred to as a known path point.

In a practical application, the foregoing physical location information and other relevant information can be derived via an interface between a switch and a base station controller, an interface between a base station and a base station controller or the signaling and an event collecting platform.

When the user is in an idle status, e.g., standby, physical location information of a home base station of the site where the user is currently located and physical location information of a resident base station after cell reselection can not be derived for the GSM network but instead is estimated and supplemented from corresponding known path points, and therefore such base stations are referred to as unknown path points.

Detailed descriptions will be presented hereinafter by using an example of deriving a user movement track of a user with reference to the drawings.

Figure 1:
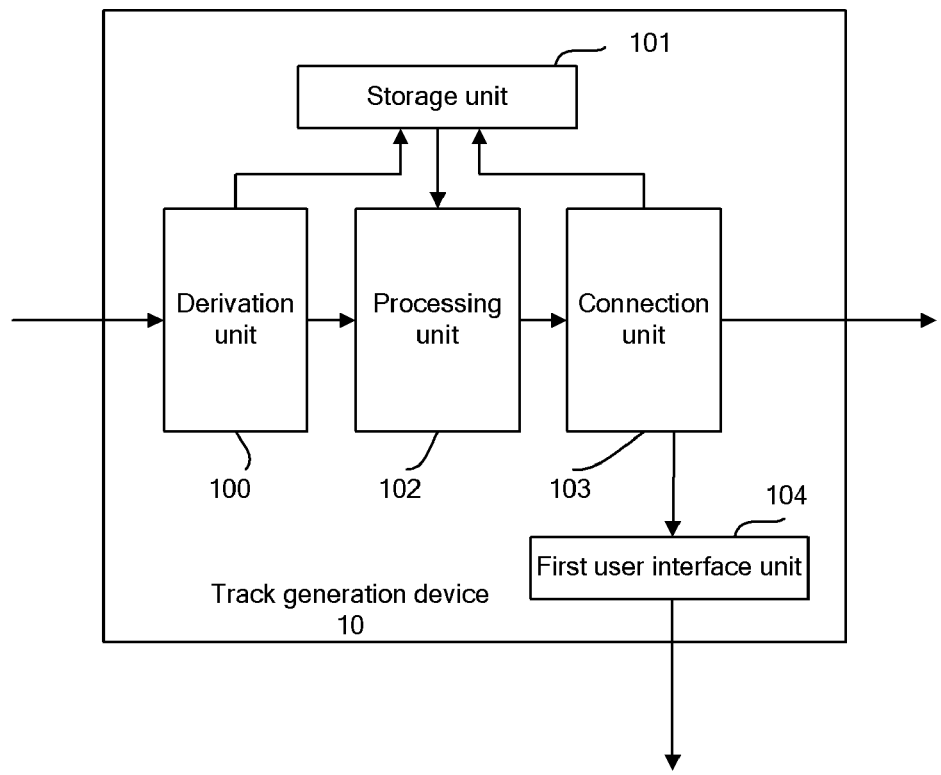
FIG. 1 is a functional schematic diagram of a track generation device according to an embodiment of the invention.

Referring to FIG. 1, a device for generating a user movement track according to an embodiment of the invention (hereinafter a track generation device 10) includes a derivation unit 100, a storage unit 101, a processing unit 102, a connection unit 103 and a first user interface unit 104.

The derivation unit 100 is adapted to derive all known path points that a user passes, which are arranged in a temporal sequence in which user events occur with the user at the respective known path points, and derive a known user movement track presents between adjacent two of the known path points based upon the temporal sequence.

The storage unit 101 is adapted to store the information derived by the derivation unit 100 and a preset condition for determining whether to generate an unknown user movement track between two adjacent known path points.

The processing unit 102 is adapted to generate an unknown user movement track containing at least one unknown path point between two adjacent known path points satisfying the preset condition.

The connection unit 103 is adapted to connect the known user movement tracks and the unknown user movement tracks in a temporal sequence to derive a user movement track of the user.

The first user interface unit 104 is adapted to present the generated user movement track to a system administrator.

Figure 2:
FIG. 2 is a schematic diagram of known path points that a user A passes according to an embodiment of the invention.
Figure 2:
Figure 2:

Based upon the foregoing track generation device 10, as shown in FIG. 2, known path points that a user passes include a base station A1, a base station A2 and a base station A3.

In a practical application, if a period of time taken by the user A to pass adjacent two of the known path points exceeds a preset threshold, the track generation device 10 may supplement a certain number of unknown path points between the two known path points during generation of a user movement track between the two known path points, and therefore such a user movement track is referred to as an unknown user movement track in the present embodiment. Referring to Formula 1, the foregoing threshold is set as 5 seconds in the present embodiment, and then the maximum number of unknown path points contained in the unknown user movement track between the two adjacent known path points is as follows:

$$N \leq INT\left(\frac{T_2 - T_1}{5}\right) - 1 \qquad \text{Formula 1}$$

where, N denotes the number of unknown path points that can be supplemented at most, and $T_1$ and $T_2$, the difference of which is in second, respectively denote the time when user events occur with the user at a known path point 1 and a known path point 2.

On the other hand, if a period of time taken by the user A to pass adjacent two of the known path points does not exceed the preset threshold, the track generation device 10 may not supplement any unknown path point during generation of a user movement track between the two known path points, that is, it is assumed that the user moves from one of the known path points directly to the other known path point adjacent thereto, and therefore such a user movement track is referred to as a known user movement track in the present embodiment.

An introduction will be presented hereinafter by using an example in which the track generation device 10 generates an unknown user movement track between the base station A1 and the base station A2.

Figure 3:
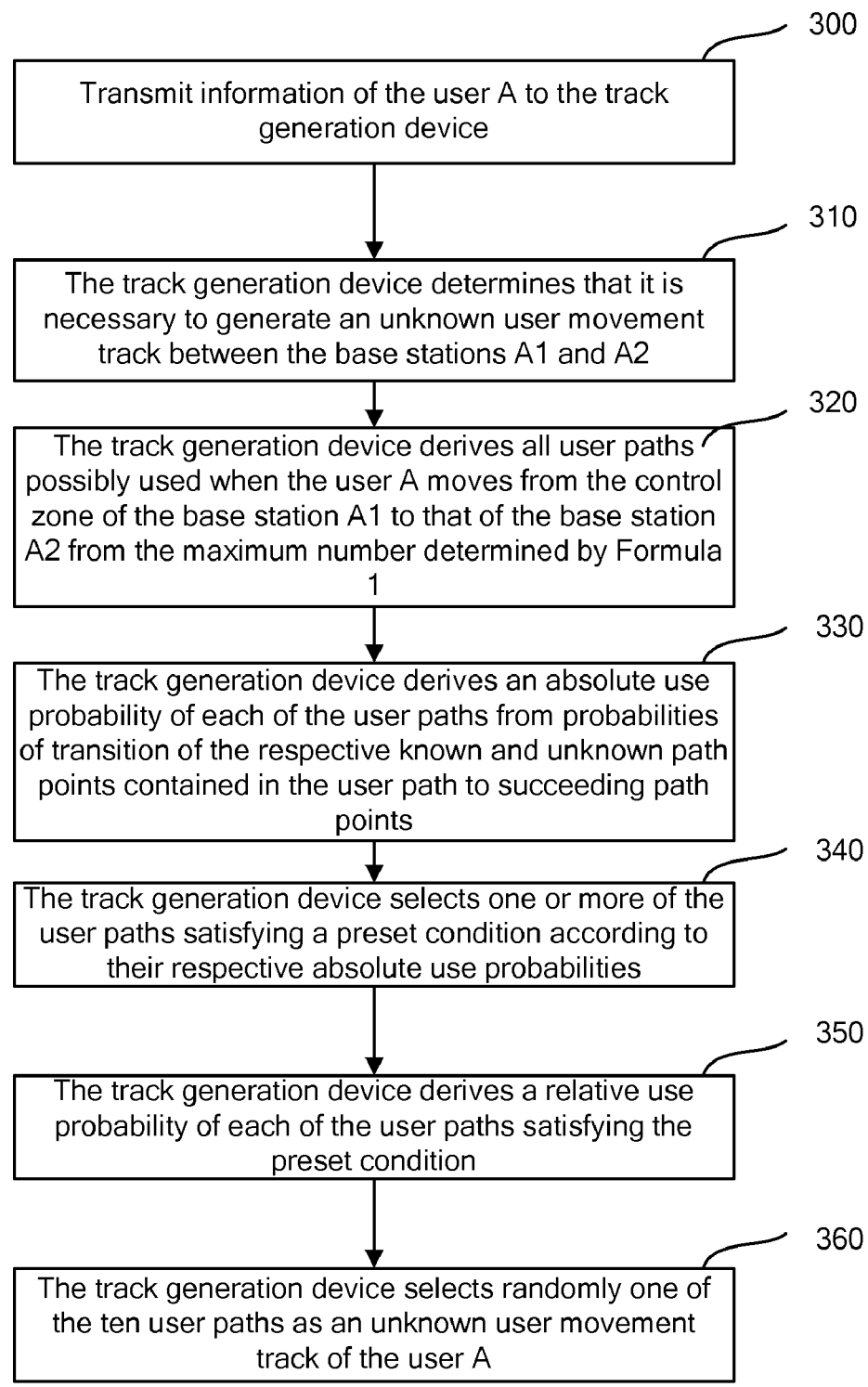
FIG. 3 is a flow chart of generating an unknown user movement track by the track generation device according to an embodiment of the invention.

As illustrated in FIG. 2, the user A passes sequentially the base station A1 and the base station A2 in the present embodiment and a period of time taken by the user A to pass the base stations A1 and A2 is 16 seconds exceeding the preset threshold, and as can be apparent from Formula 1, the track generation device 10 may supplement at most two unknown path points between the two known path points during generation of an unknown user movement track of the user A between the base station A1 and the base station A2. Then referring to FIG. 3, the track generation device 10, in the present embodiment, generates an unknown user movement track of the user A between the base station A1 and the base station A2 in a detailed flow as follows:

Process 300: Physical location information of the base station A1 and the base station A2 and the user events occurring with the user A respectively in control zones of the base station A1 and the base station A2 and corresponding time of the user events are transmitted to the track generation device 10.

For example, the relevant information of the user A transmitted to the track generation device 10 is as illustrated in Table 1.

TABLE 1

| Time | International mobile subscriber identity | Location area | Cell identifier | Event |
|---|---|---|---|---|
| ... | ... | ... | ... | ... |
| 2007-9-21 17:11 | 460001480216302 | 4358 | 9876 | Location update |
| 2007-9-22 17:41 | 460001480216302 | 4358 | 9876 | Short message |
| 2007-9-21 18:01 | 460001480216302 | 4358 | 5878 | Initial call attempt |
| 2007-9-21 18:02 | 460001480216302 | 4358 | 11251 | Initial call attempt end |
| 2007-9-21 18:03 | 460001480216302 | 4358 | 5878 | Call start |
| 2007-9-21 18:05 | 460001480216302 | 4358 | 5878 | Call end |
| 2007-9-21 18:10 | 460001480216302 | 4358 | 5878 | Power off |
| 2007-9-21 19:14 | 460001480216302 | 4358 | 9876 | Power on |
| 2007-9-22 19:34 | 460001480216302 | 4358 | 7685 | Location update |
| ... | ... | ... | ... | ... |

Process 310: The track generation device 10 determines generation of an unknown user movement track between the base station A1 and the base station A2.

In a practical application, if the user A answers a call in the control zone of the base station A1 and hangs up in the control zone of the base station A2, the track generation device 10 may derive a known user movement track of the user A between the base station A1 and the base station A2 directly from the signaling and an event collecting platform, and then it is not necessary for the track generation device 10 to generate a corresponding unknown user movement track even if the period of time taken by the user A to move from the control zone of the base station A1 to that of the base station A2 exceeds 5 seconds.

Process 320: The track generation device 10 derives from the maximum number determined by Formula 1 all user paths possibly used when the user A moves from the control zone of the base station A1 to that of the base station A2.

Figure 4:
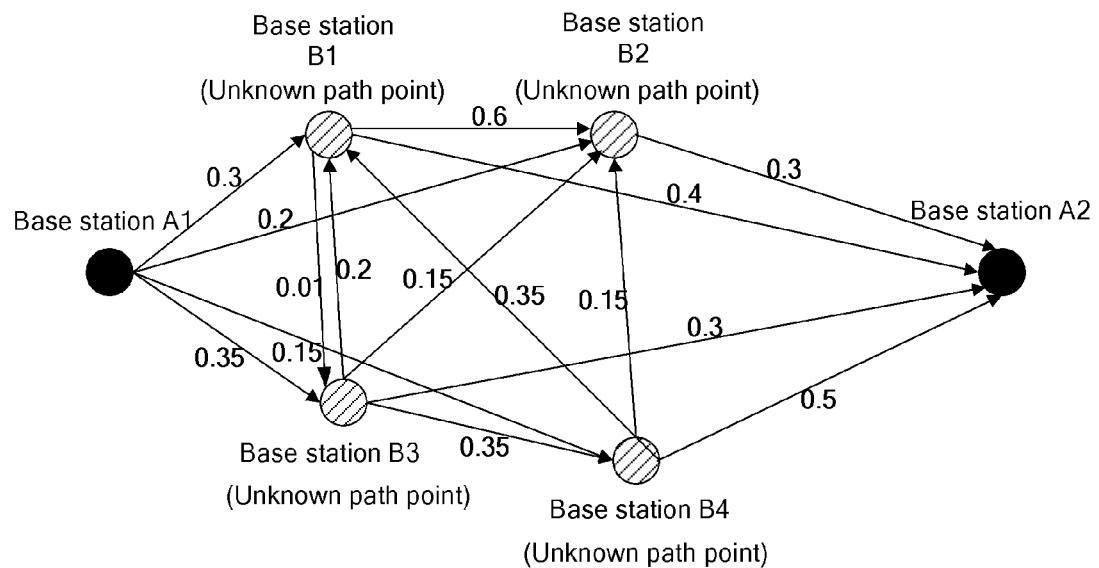
FIG. 4 is a schematic diagram of calculating absolute used probability of respective user paths according to an embodiment of the invention.

Referring to FIG. 4, presence of additional four unknown path points, a base station B1, a base station B2, a base station B3 and a base station B4 respectively, between the base station A1 and the base station A2 is assumed in the present embodiment, and then there are plural user paths starting with the base station A1 and ending with the base station A2 and passing at most two unknown path points, for example:

Path 1: A1->B1->A2
Path 2: A1->B1->B2->A2
Path 3: A1->B2->A2
Path 4: A1->B3->B1->A2
Path 5: A1->B3->B2->A2
Path 6: A1->B3->B4->A2
Path 7: A1->B3->A2
Path 8: A1->B4->A2
Path 9: A1->B4->B2->A2
Path 10: A1->B4->B1->A2
Path 11: A1->B1->B3->A2

Process 330: The track generation device 10 derives an absolute use probability of each of the user paths from probabilities of transition of the respective known and unknown path points contained in the user path to succeeding path points.

As illustrated in Table 2, all the user paths possibly used for the user A and their corresponding absolute use probabilities in the present embodiment are as follows:

TABLE 2

| Serial No. | Path | Derivation | Absolute use probability |
|---|---|---|---|
| 1 | A1 -> B1 -> A2 | 0.3 × 0.4 | 0.12 |
| 2 | A1 -> B1 -> B2 -> A2 | 0.3 × 0.6 × 0.3 | 0.054 |
| 3 | A1 -> B2 -> A2 | 0.2 × 0.3 | 0.06 |

TABLE 2-continued

| Serial No. | Path | Derivation | Absolute use probability |
|---|---|---|---|
| 4 | A1 -> B3 -> B1 -> A2 | 0.35 × 0.2 × 0.4 | 0.028 |
| 5 | A1 -> B3 -> B2 -> A2 | 0.35 × 0.15 × 0.3 | 0.01575 |
| 6 | A1 -> B3 -> B4 -> A2 | 0.35 × 0.35 × 0.5 | 0.06125 |
| 7 | A1 -> B3 -> A2 | 0.35 × 0.3 | 0.105 |
| 8 | A1 -> B4 -> A2 | 0.15 × 0.5 | 0.075 |
| 9 | A1 -> B4 -> B2 -> A2 | 0.15 × 0.15 × 0.3 | 0.00675 |
| 10 | A1 -> B4 -> B1 -> A2 | 0.15 × 0.35 × 0.4 | 0.021 |
| 11 | A1 -> B1 -> B3 -> A2 | 0.3 × 0.01 × 0.3 | 0.0009 |

Particularly, the probabilities of transition of the respective known and unknown path points to succeeding path points may be derived in numerous statistic methods, for example, from statistic data of an Operation Management Center (OMC).

Process 340: The track generation device 10 selects one or more of the user paths, which satisfy a preset condition, according to their respective absolute use probabilities.

In a practical application, a user path with a too low absolute use probability may be of unimportance for reference, and therefore after deriving the absolute use probabilities of the respective user paths, the track generation device 10 may perform a subsequent process only on those of the user paths with relatively high absolute use probabilities to derive an unknown user movement track of the user A. In the present embodiment, for example, the track generation device 10 may select ten user paths with the highest absolute use probabilities for a subsequent process without considering the remaining user paths after deriving the absolute use probabilities of the respective user paths. Of course, a subsequent process may alternatively be performed on all the generated user paths for the purpose of a precision improved processing result, and repeated descriptions thereof are omitted here. Then as illustrated in Table 3, the track generation device 10 finally determines ten user paths as follows:

TABLE 3

| Serial No. | Path |
|---|---|
| 1 | A1 -> B1 -> A2 |
| 7 | A1 -> B3 -> A2 |
| 8 | A1 -> B4 -> A2 |
| 6 | A1 -> B3 -> B4 -> A2 |
| 3 | A1 -> B2 -> A2 |
| 2 | A1 -> B1 -> B2 -> A2 |
| 4 | A1 -> B3 -> B1 -> A2 |
| 10 | A1 -> B4 -> B1 -> A2 |
| 5 | A1 -> B3 -> B2 -> A2 |
| 9 | A1 -> B4 -> B2 -> A2 |

Process 350: The track generation device 10 derives a relative use probability of each of the user paths satisfying the preset condition.

In a practical application, the user A finally uses one path, and therefore a relative use probability of each of the foregoing ten user paths may further be calculated by the following formula after deriving the absolute use probabilities of the use paths:

$$P_i = \frac{pA_i}{\sum_{i=1}^{N} pA_i}$$ Formula 2

Particularly, $P_i$ is a relative use probability of the $i^{th}$ user path, $pA_i$ is the absolute use probability of the $i^{th}$ user path, and N is the number of user paths derived by the track generation device 10 for processing, N=10 in the present embodiment.

Then as illustrated in Table 4, in the present embodiment, the respective relative use probabilities of the ten user paths determined by the track generation device 10 are as follows:

TABLE 4

| Serial No. | Path | Absolute use probability | Relative use probability |
| --- | --- | --- | --- |
| 1 | A1 -> B1 -> A2 | 0.12 | 0.219478738 |
| 7 | A1 -> B3 -> A2 | 0.105 | 0.192043896 |
| 8 | A1 -> B4 -> A2 | 0.075 | 0.137174211 |
| 6 | A1 -> B3 -> B4 -> A2 | 0.06125 | 0.112025606 |
| 3 | A1 -> B2 -> A2 | 0.06 | 0.109739369 |
| 2 | A1 -> B1 -> B2 -> A2 | 0.054 | 0.098765432 |
| 4 | A1 -> B3 -> B1 -> A2 | 0.028 | 0.051211706 |
| 10 | A1 -> B4 -> B1 -> A2 | 0.021 | 0.038408779 |
| 5 | A1 -> B3 -> B2 -> A2 | 0.01575 | 0.028806584 |
| 9 | A1 -> B4 -> B2 -> A2 | 0.00675 | 0.012345679 |

Process 360: The track generation device 10 randomly selects one of the ten user paths according to the relative use probabilities of the respective user paths as a corresponding unknown user movement track when the user A moves from the control zone of the base station A1 to that of the base station A2.

Particularly in the process of selecting randomly one of the user paths according to the relative use probabilities of the respective user paths: the relative use probability of the foregoing user path 1 is about 0.22, and then there is a probability of 22% that the track generation device 10 selects the user path 1; and the relative use probability of the foregoing user path 7 is about 0.19, and then there is a probability of 19% that the track generation device 10 selects the user path 7, therefore, a user path with a higher relative use probability may be more probably selected.

For example, if the user path selected by the track generation device 10 is the path 2 of A1->B1->B2->A2, the base station B1 and the base station B2 are unknown path points to be supplemented between the base station A1 and the base station A2, and the path 2 is a corresponding unknown user movement track when the user A moves from the control zone of the base station A1 to that of the base station A2.

Based upon the foregoing embodiment, the known path points that the user A passes further include the base station A3 as illustrated in FIG. 2, and in the present embodiment, because the period of time taken by the user to move from the base station A2 to the base station A3 does not exceed 5 seconds, a user movement track between the base station A2 and the base station A3, i.e. A2->A3, is a known user movement track, and the track generation device 10 connects the unknown user movement track and the known user movement track of the user A in a temporal sequence to derive the resultant user movement track of the user A, i.e., A1->B1->B2->A2->A3.

Alike, user movement tracks of the other users in the GSM network may also be derived in the foregoing method, and after the user movement tracks of all the users in the GSM network have been derived, the user mobility model of the huge number of users can be created from the respective user movement tracks.

Figure 5:
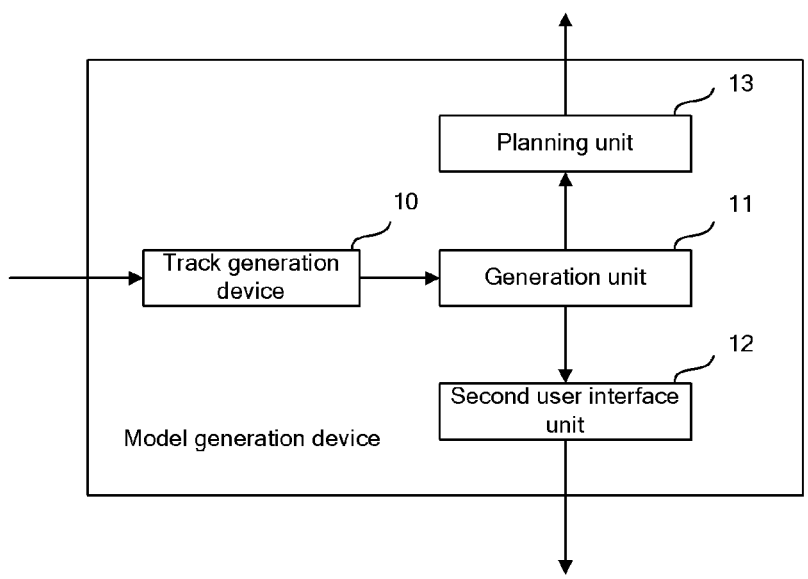
FIG. 5 is a functional schematic diagram of a model generation device according to an embodiment of the invention.

Referring to FIG. 5, a device for generating a user mobility model according to an embodiment of the invention (hereinafter a model generation device) includes the track generation device 10, a generation unit 11 and a second user interface unit 12.

The track generation device 10 is adapted to derive user movement tracks of all users in a cellular network.

The generation unit 11 is adapted to generate from the user movement tracks of the respective users a user mobility model involving a user traffic between any two of path points in the cellular network, the path points include known and unknown path points.

The second user interface unit 12 is adapted to present the generated user mobility model to a system administrator.

Descriptions will be presented below by using an example in which the two known path points, the base station A1 and the base station A2, and the four unknown path points, the base station B1, the base station B2, the base station B3 and the base station B4, exist in the GSM network.

In the present embodiment, there are nine users in the GSM network, and the model generation device derives respective user movement tracks as follows:

User A: A1->B1->A2
User B: A1->B3->B1->B2->A2
User C: A1->B3->B4->B1->B2->A2
User D: A1->B3->B4->B1->B2->A2
User E: A1->B3->B4->A2
User F: A2->B4->B3->A1
User G: A2->B1->A1
User H: A2->B4->B3->A1
User I: A2->B2->B1->B3->A1

The model generation device may derive from the foregoing user movement tracks the number of times that users move (i.e., a user traffic) between any two of the path points (including known and unknown path points), for example, the users B, C, D and E each passes A1->B3 once, therefore the user traffic of A1->B3 is 4; and the users B, C and D each passes B1->B2 once, therefore the user traffic of B1->B2 is 3.

This manner may be applied to the other path points, as illustrated in FIG. 6, a corresponding Markov matrix may be generated from the foregoing respective user movement tracks, and the Markov matrix is just the user mobility model created for all the users in the GSM network, and the user mobility model involves a user traffic between any two of the path points in the GSM network, the path points include known and unknown path points corresponding respectively to cells in the GSM network.

Apparently, a corresponding Markov matrix may be generated as illustrated in FIG. 7 if there are more known and unknown path points in the GSM network, and repeated descriptions thereof is omitted here.

An overall planning of the GSM network, e.g., re-dividing it into location areas, may be performed after the model generation device generated the user mobility model of the GSM network. Correspondingly in the present embodiment, the model generation device further includes a planning unit 13 as illustrated in FIG. 5, which is adapted to redeploy location areas in the GSM network.

In a practical application, a location update flow with the system may be triggered when a user moves across location areas, which may occupy a large number of network resources (e.g., a separate dedicated control channel), therefore, one of factors to be considered for division into location areas is that a user traffic at a boundary between the location areas physically adjacent shall be lower than a preset threshold.

On the other hand, the factors to be considered further include that other network loads in the respective location areas, e.g., the number of carrier frequencies, the number of users, voice traffic, shall also be commensurate, that is, the difference between total network loads in the respective location areas shall not exceed a preset threshold, so that the GSM network can be load balanced to improve the utilization ratio of various network resources.

Figure 8:
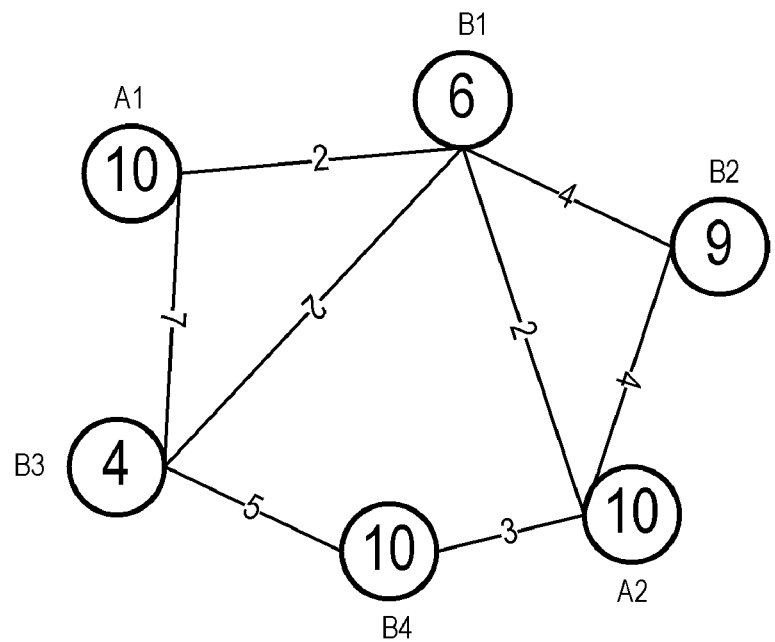
FIG. 8 is a schematic diagram of network loads of respective base stations according to an embodiment of the invention.
Figure 9:
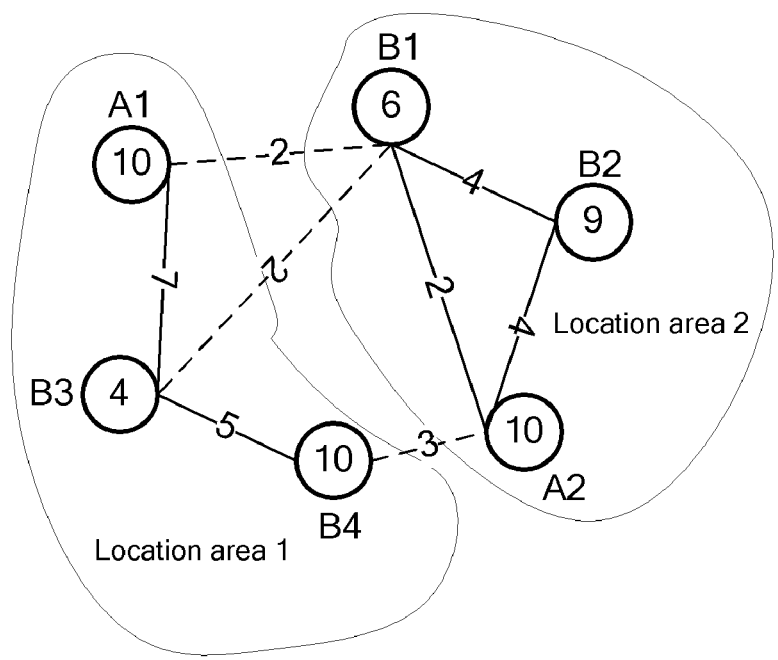
FIG. 9 is a schematic diagram of respective location areas resulting from re-division according to an embodiment of the invention.

Referring to FIG. 8, for example, the sum of user traffics in both directions between the respective path points may be determined from the generated user mobility model, and also network loads of the respective base stations may be derived from statistic data. For example, the network load of the base station A1 is 10 (including any one or combination of service operations of carrier frequencies, voice traffic, paging messages, etc.), and the network loads of the base station A2, the base station B1, the base station B2, the base station B3 and the base station B4 are 10, 6, 9, 4 and 10 respectively; and then re-division into location areas may be performed according to the derived network loads of the respective base stations and user traffics between the respective base stations. Referring to FIG. 9, two location areas are re-divided in view of the foregoing plural factors so that the total network load in the location area 1 is 24 and that in the location area 2 is 25, both of which are substantially commensurate, and the user traffic at the boundary between the location area 1 and the location area 2 is 7 (as illustrated in the dashed part of FIG. 9). Evidently, the network resources in the system may be reallocated to the respective re-divided location areas for load balancing thereof to thereby improve the utilization ratio of the network resources; and also the reduced user traffic between the respective location areas can decrease to some extent the location update flow to be triggered due to a user moves across the location areas to thereby save the network resources to some extent.

Although the above embodiments are described by taking the GSM network as an example, it shall be understood by those skilled in the art that the above embodiments can also be suitable for other cellular networks.

Lastly it shall be noted that the foregoing embodiments are merely intended to illustrate but not limit the technical solutions of the invention, and although the invention has been detailed with reference to the preferred embodiments thereof, those ordinarily skilled in the art shall appreciate that the technical solutions according to the embodiments of the invention can still be modified or equivalently substituted without departing from the spirit and scope of the invention.

The invention claimed is:

1. A method for generating a user movement track, comprising:
    deriving all known path points that a user passes, wherein all the known path points are arranged in a temporal sequence in which user events occur with the user at the respective known path points;
    deriving a known user movement track between adjacent two of the known path points based upon the temporal sequence;
    generating an unknown user movement track containing at least one unknown path point between two adjacent known path points satisfying a preset condition; and
    connecting the known user movement tracks and the unknown user movement tracks in a temporal sequence to derive a user movement track of the user.

2. The method of claim 1, wherein the preset condition comprises that a period of time taken by the user to pass the two adjacent known path points exceeds a preset threshold.

3. The method of claim 2, wherein generating the unknown user movement track between the two adjacent known path points comprises:
    deriving a period of time taken by the user to move from a first known path point to a second known path point adjacent to the first known path point;
    determining, from the period of time, the maximum number of unknown path points contained in an unknown user movement track between the first known path point and the second known path point;
    determining all unknown path points that the user possibly passes, and generating, from the maximum number, all user paths that can be used by the user to move from the first known path point to the second known path point; and
    selecting and determining one of all the user paths as an unknown user movement track between the first known path point and the second known path point.

4. The method of claim 3, wherein the maximum number of unknown path points contained in an unknown user movement track between the first known path point and the second known path point is determined by a formula $$N \le INT\left(\frac{T_2 - T_1}{5}\right) - 1,$$

wherein $T_1$ and $T_2$ respectively denote time when user events occur with the user at the first known path point and the second known path point.

5. The method of claim 3, wherein selecting one of all the generated user paths comprises:
    deriving absolute use probabilities of all the generated user paths;
    deriving relative use probabilities of all the generated user paths from the absolute use probabilities of all the generated user paths; and
    selecting randomly one of all the generated user paths according to the relative use probabilities of the respective user paths.

6. The method of claim 5, wherein deriving the absolute use probability of a user path comprises:
    deriving probabilities of transition of path points including known and unknown path points contained in the user path to their adjacent succeeding path points; and
    multiplying the derived probabilities of transition.

7. The method of claim 5, wherein each of the relative use probabilities of the user paths is determined by a formula $$P_i = \frac{pA_i}{\sum_{i=1}^{N} pA_i},$$

wherein $pA_i$ denotes the absolute use probability of the $i^{th}$ user path, and N denotes the number of user paths for processing.

8. The method of claim 1, wherein the user events comprise powering on or off, reception or transmission of a short message, dialing a call, answering a call, hanging up or a location update for crossing location areas.

9. The method of claim 1, further comprising:
deriving user movement tracks of all users in a cellular network; and
generating, from the user movement tracks of all the users, a user mobility model involving a user traffic between any two of path points in the cellular network, wherein the path points comprise known and unknown path points.

10. The method of claim 9, wherein the cellular network is re-divided into location areas according to the mobility model, so that differences between total network loads of all the location areas are less than a preset threshold.

11. The method of claim 10, wherein a user traffic at a boundary between any two of all the location areas that are physically adjacent is less than a preset threshold.

12. A device for generating a user movement track, comprising:
a derivation unit adapted to derive all known path points that a user passes, wherein all the known path points are arranged in a temporal sequence in which user events occur with the user at the respective known path points, and derive a known user movement track present between adjacent two of the known path points based upon the temporal sequence;
a storage unit adapted to store the information derived by the derivation unit and a preset condition for determining whether to generate an unknown user movement track between two adjacent known path points;
a processing unit adapted to generate an unknown user movement track containing at least one unknown path point between two adjacent known path points satisfying the preset condition; and
a connection unit adapted to connect the known user movement tracks and the unknown user movement tracks in a temporal sequence to derive a user movement track of the user.

13. The device of claim 12, wherein the processing unit generates the unknown user movement track between the two adjacent known path points when user events occur with the user respectively at the two adjacent known path points at an interval of time exceeding a preset threshold.

14. The device of claim 12, wherein when generating the unknown user movement track between the adjacent first and second known path points, the processing unit determines, from a period of time taken by the user to move from the first known path point to the second known path point, the maximum number of unknown path points contained in the unknown user movement track; generates, from the maximum number and all unknown path points that the user possibly passes, all user paths that can be taken by the user to move from the first known path point to the second known path point; and determines a selected one of all the user paths as the unknown user movement track.

15. The device of claim 14, wherein when selecting one of all the generated user paths, the processing unit derives absolute use probabilities of all the generated user paths, derives relative use probabilities of all the generated user paths from the absolute use probabilities of the user paths, and selects randomly one of all the generated user paths according to the relative use probabilities of the user paths.

16. The device of claim 12, further comprising:
a generation unit adapted to generate, from user movement tracks of all the users in a cellular network derived by the connection unit, a user mobility model involving a user traffic between any two of path points in the cellular network, wherein the path points comprise known and unknown path points.

17. The device of claim 16, further comprising:
a planning unit adapted to re-divide the cellular network into location areas according to the mobility model, so that a user traffic at a boundary between any two of the respective re-divided location areas that are physically adjacent is less than a preset threshold.

* * * * *